US006836795B2

(12) United States Patent
Soderberg et al.

(10) Patent No.: US 6,836,795 B2
(45) Date of Patent: Dec. 28, 2004

(54) MAPPING CONNECTIONS AND PROTOCOL-SPECIFIC RESOURCE IDENTIFIERS

(75) Inventors: Joel M. Soderberg, Edmonds, WA (US); Brian J. Deen, North Bend, WA (US); Alexander I. Hopmann, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

(21) Appl. No.: 09/774,963

(22) Filed: Jan. 31, 2001

(65) Prior Publication Data

US 2002/0103857 A1 Aug. 1, 2002

(51) Int. Cl.[7] .............................................. G06F 15/173
(52) U.S. Cl. ........................ 709/223; 709/225; 709/227
(58) Field of Search ................................. 709/223, 225, 709/227

(56) References Cited

U.S. PATENT DOCUMENTS

| 6,081,900 | A | * | 6/2000 | Subramaniam et al. ...... 713/201 |
| 6,336,137 | B1 | * | 1/2002 | Lee et al. .................... 709/219 |
| 2002/0103881 | A1 | * | 8/2002 | Granade et al. ............. 709/218 |

OTHER PUBLICATIONS

Eun–Kyeong, Yong–Gu, and Ki–Joon, Integrated Transport Layer Security: End –to End Model between WTLS and TLS, Information Networking 2001, Jan. 31–Feb. 2, 2001, pp. 65–71.*

Hung and Zhang, On the Feasibility of the Usage of WAP Devices in Telemedicine, IEEE International Conf., Nov. 9–10, 2000, pp. 28–31.*

* cited by examiner

Primary Examiner—Zarni Maung
Assistant Examiner—Ashok B. Patel
(74) Attorney, Agent, or Firm—Workman Nydegger (57) ABSTRACT

Methods, systems, and computer program products for mapping connections and protocol specific resource identifiers. A front-end server receives a request for content from a client. The front-end server decrypts the request as needed, adds a protocol information to the request that identifies the communication protocol used between the client and the front-end server, and then forwards the request to a back-end server for processing. When the back-end server processes the request, the requested content may include one or more protocol specific resource identifiers. However, the protocol specific resource identifiers are based on the protocol information included in the request rather than the protocol used between the front-end server and the back-end server. Upon receiving the requested content back from the back-end server, the front-end server encrypts the content as needed and sends the content to the requesting client.

34 Claims, 4 Drawing Sheets

MAPPING CONNECTIONS AND PROTOCOL-SPECIFIC RESOURCE IDENTIFIERS

BACKGROUND OF THE INVENTION

1. The Field of the Invention

The present invention relates to mapping connections and protocol specific resource identifiers. More specifically, the present invention relates to a front-end server providing access to content stored on a back-end server by mapping the connection between a client system and the front-end server with the corresponding connection between the front-end server and the back-end server. As needed, protocol specific resource identifiers are generated to match the protocol associated with the connection between the client system and the front-end server.

2. Background and Related Art

At times, a client system on an insecure network, such as the Internet, may request hypertext transfer protocol ("HTTP") content from a back-end server that is operating on a relatively secure private network, such as a corporate intranet. It may also be the case that such HTTP requests made by the client are encrypted to prevent unwanted data interception. Conventionally, the back-end server would decrypt the request, processes the request, encrypt data associated with the request, and send the data to the client system. However, encrypting and decrypting HTTP data is computationally expensive and as result drains resources a back-end server might use to perform other functions, such as query a database or other configured tasks.

Where multiple back-end servers provide related content, a front-end server may be used as a common point of access. Client systems direct requests to the front-end server and the front-end server forwards the request to the appropriate back-end server. This allows for content to be distributed and enables load balancing across the servers where the content is available. For example, email stores for an organization may be distributed over several back-end servers, with a single front-end server allowing all stores to be accessed using a single resource identifier, such as "http://www.company.com/email". When the front-end server receives a request for email, the request is directed to the back-end server where the corresponding email stored is located.

To prevent eavesdropping and insure data integrity, communication between the client systems and the front-end server may use a secure protocol. In contrast, the communication between the front-end server and the back-end server may not need to use a secure protocol because the communication link itself may not subject to tampering, such as a communication link that is isolated from external contact. However, using a secure protocol between the client and front-end server with an insecure protocol between the front-end server and back-end server leads to certain problems.

Consider for example, providing email using HTTP for communication between the back-end server and the front-end server, and using HTTPS (HTTP with a secure sockets layer or SSL) for the communication between the front-end server and the client system. At login, the client system submits an HTTPS request to view the client system's inbox. The front-end server receives the request, performs the appropriate decryption, and directs the request to the back-end server where the inbox is located. In response, the back-end server generates an HTTP version of the inbox (i.e., the uniform resource locators ("URLs") for the inbox specify "http" as the protocol). The response is returned to the front-end server and sent to the requesting client system. Upon selection of a URL, the client system generates a request for the corresponding email. However, because the URL specifies HTTP as the protocol, the request to the front-end server is made over an insecure connection. Obviously, this is not what the client system intended since the client system initiated contact using a secure protocol.

Moreover, requesting email content over an insecure connection is a further problem because the front-end server may be configured to communicate over external insecure networks only using protocols such as HTTPS. Thus, a front-end server may not be configured to use insecure protocols on insecure networks. As a result, the front-end server rejects any requests from the client that use an insecure protocol. Alternatively, the front-end server may be configured to allow insecure requests for some data, such as publicly accessible Web pages, while rejecting requests for more sensitive content, such as email content. In either case, the potential exists for the front-end server to reject a request submitted over an insecure connection.

Although communicating between the front-end server and the back-end server with the same protocol that is used between the client system and the front-end server may solve the HTTP URL problem, this approach is undesirable because it requires the back-end server to encrypt the content it provides. As noted above, this encryption may be computationally expensive and may serve no useful purpose if the connection between the front-end server and the back-end server is not subject to attack. Furthermore, the front-end server is required first to decrypt the content it receives from the back-end server, using the key negotiated between the front-end server and the back-end server, and then to re-encrypt the content, using the key negotiated between the front-end server and the client. To avoid the unneeded encryption/decryption operations, the front-end server could parse the content it receives from the back-end servers and modify protocol specific resource identifiers as needed. However, similar to the extra encryption/decryption processing, parsing content at the front-end server for protocol specific resource identifiers is computationally expensive and requires storing content, at least temporarily, on the front-end server. For these reasons and others, parsing content at the front-end server is also undesirable.

Therefore, systems, methods, and computer program products are desired for mapping connections and protocol specific resource identifiers, where the systems, methods, and computer program products impose minimal resource requirements on the front-end server and back-end servers.

SUMMARY OF THE INVENTION

The principles of the present invention provide for mapping connections and protocol specific resource identifiers. When a front-end server receives a request that is ultimately directed to a back-end server, the front-end server performs certain operations on the request before forwarding it to the back-end server. First, the front-end server decrypts the request as needed. Second, the front-end inserts a protocol element into the request sent to the back-end server to notify the back-end server of the protocol used in the client's request to the front-end server. When the back-end server retrieves data associated with the request, the back-end server passes the content to the front-end server. When received, the front-end server sends the content to the client according to the protocol used in the client's request. The back-end server generates protocol specific resource identifiers within the content that are consistent with the protocol element or information included with the request for content, even though the front-end server and the back-end server may use another protocol in communicating with each other. For example, the client system and the front end server may communicate using HTTPS, while the front end server communicates with the back end server using HTTP. Because the front-end server performs any needed encryption and decryption for requests only once, the resources of the front-end server and back-end servers are freed up to perform other tasks. Also, the front-end server will not reject subsequent requests for content that the client generates based on the selection of protocol specific resource identifiers in content that has been received. Because the back-end server generates resource identifiers consistent with the protocol used between the client system and the front-end server, requested content may be sent to the client system even where the front-end server and back-end server communicate using a protocol that is not entirely compatible with communication protocol used between the client system and the front-end server.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which is illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to methods, systems, and computer program products for mapping connections and protocol specific resource identifiers. The embodiments of the present invention may comprise a special purpose or general-purpose computer including various computer hardware components, as discussed in greater detail below.

Embodiments within the scope of the present invention also include computer-readable media for carrying or having computer-executable instructions or data structures stored thereon. Such computer-readable media can be any available media, which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
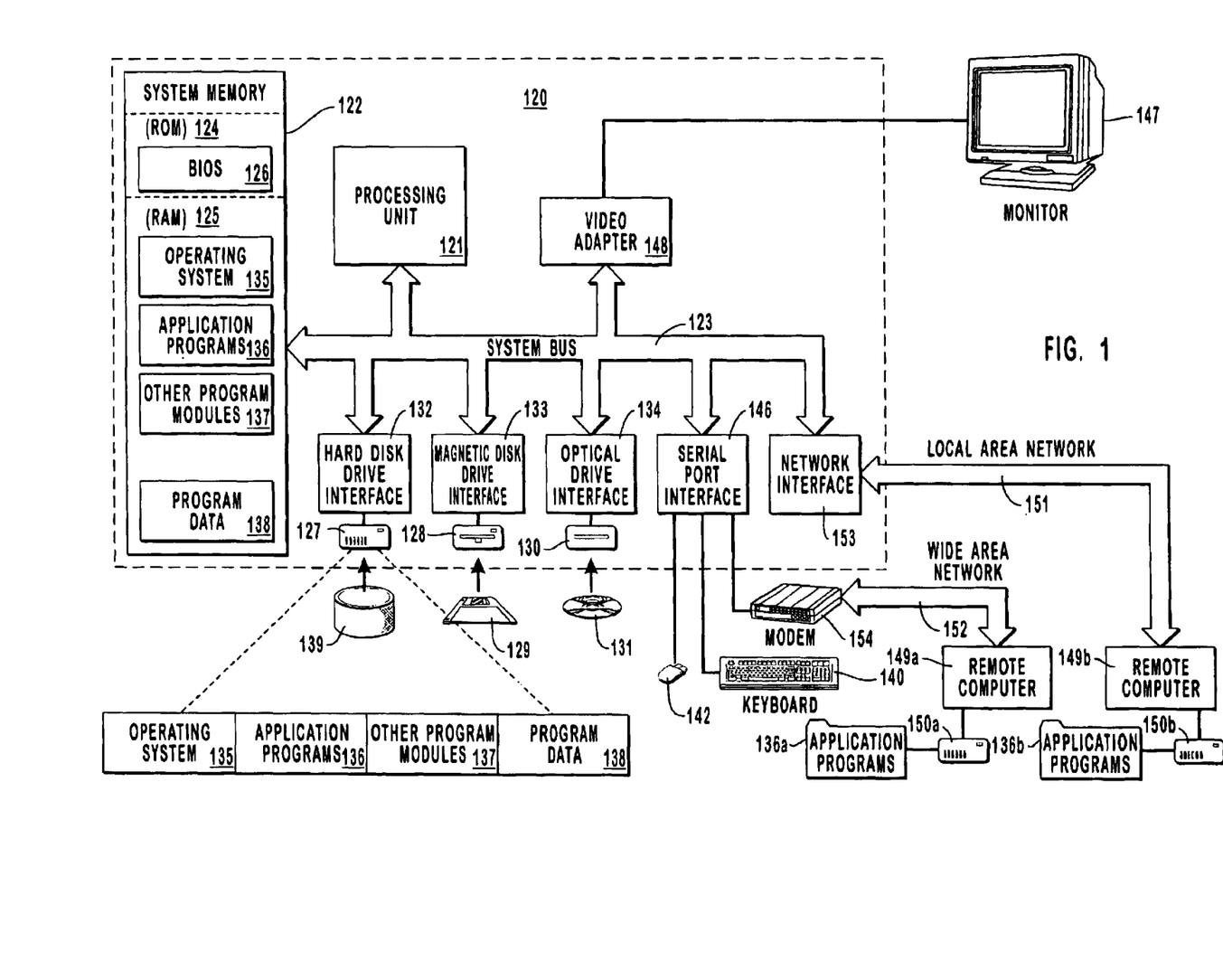
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. The sequence of instructions implemented in a particular data structure or program module represents examples of corresponding acts for implementing the functions or steps described herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general-purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 46 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device It will be appreciated that the network connections shown are exemplary and other means of establishing communications over wide area network 152 may be used.

In this description and in the following claims, the term "computer" should be interpreted broadly to encompass a general purpose or special purpose computer or any other computing device including, but not limited to, various computer hardware components, such as those illustrated in FIG. 1. A "computer system" may include a group of one or more computers that interact cooperatively to perform one or more functions. A "network system" may include a plurality of interconnected computer systems, as well as other devices that may be connected to computer systems. A "client system" may be a computer system, a group of computer systems, other devices that may be associated with a network system, or some combination thereof, that use the services of another computer system. In contrast, a "server system" may be a computer system, group of computer systems, other devices that might be associated with a network system, or some combination thereof, that provide services to another computer system.

Note that a computer system may use the services of another computer system and yet still provide services to other computer systems. Thus, a client system in one context may also be a server system in another context. Similarly, a server system in one context may also be a client system in another context. This principle is applicable to all embodiments of the present invention.

The HyperText Transfer Protocol, or HTTP, is the underlying protocol used by the World Wide Web ("Web"). HTTP defines how messages are formatted and transmitted, and what actions Web servers and browsers should take in response to various commands. HTTP is an insecure protocol.

Secure Sockets Layer, or SSL, is a protocol developed for transmitting private documents via the Internet. SSL works by simultaneously (at both a client system and a server) generating a symmetric key from a private/public encryption key pair, and then using the symmetric key to encrypt data that is transferred over the SSL connection. For secure communication, SSL and HTTP may be used together.

As the term implies, a resource identifier uniquely identifies resources or content. HTTP defines one type of resource identifier, a Uniform Resource Locator, or URL. A Uniform Resource Locator is the global address of content, such as documents and other resources available on the World Wide Web. The first part of the URL indicates the protocol to use in requesting a resource. For example, if the first part of the URL is "http:", the HTTP protocol is used. In contrast, if the first part of the URL is "https:", SSL is used in connection with the HTTP protocol. The remainder of the URL specifies the IP address or the domain name where the resource is located, including any necessary directory hierarchy. Due to the close relationship between HTTPS and SSL, specifically that one generally, but not necessarily, implies the other, HTTPS and SSL may be used synonymously in various portions of the following disclosure.

Figure 2:
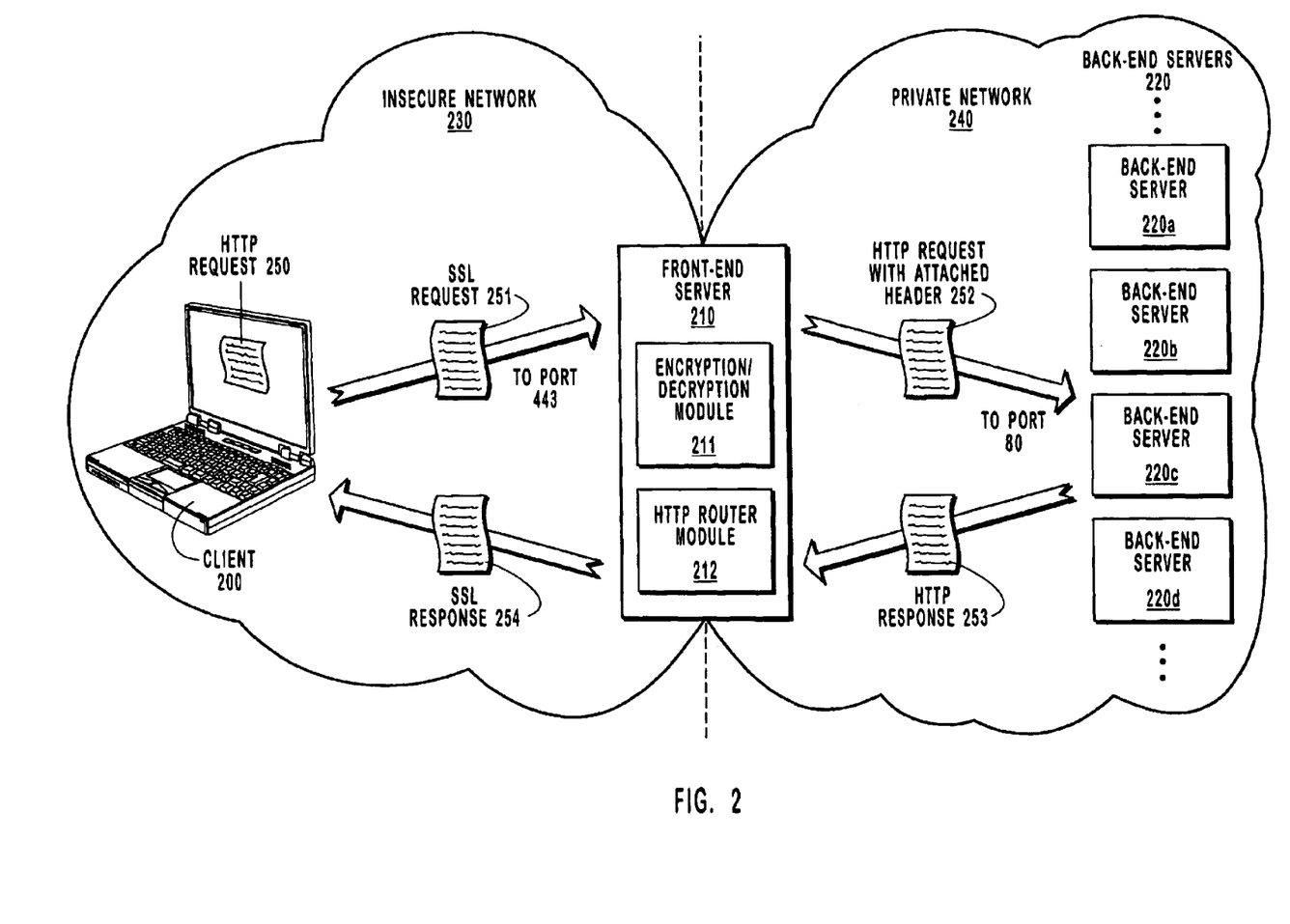
FIG. 2 is illustrates a client system, front-end server, and back-end server operating in accordance with the present invention.

While FIG. 1 and the corresponding discussion above provide a general description of a suitable environment in which the invention may be implemented, it will be appreciated that the features of the present invention may be practiced in association with a variety of configurations. Therefore, the components illustrated in FIG. 2 provide only one exemplary environment for practicing the present invention. It should be understood that the present invention, as described in connection with FIG. 2, may also be practiced in a configuration that additionally includes one or more of the components as shown in FIG. 1.

FIG. 2 illustrates a network configuration suitable for implementing the principles of the present invention. The configuration includes client 200, insecure network 230, front-end server 210, private network 240, and back-end servers 220. Back-end servers 220 includes back-end server 220a, 220b, 220c and 220d respectively. Although only one client and one front-end server are illustrated in FIG. 2, the general principles disclosed herein can be readily adapted to configurations having any number of clients systems and front-end servers in combination.

The insecure network 230, which may comprise the Internet, includes client 200, which is in communication with front-end server 210. Private network 240 includes the back-end servers 220a, 220b, 220c and 220d, each of which is also in communication with front-end server 210. Network configurations for private network 240 include, but are not limited to, Ethernet, token ring, Arcnet, or any other network configuration or combination thereof. Insecure network 230 can be any of these configurations, including the Internet. Although described in the context of a client system on an insecure network communicating with a back-end server on a secure network, the present invention is not necessarily limited to any particular network or communication protocol. Likewise, the present invention is not limited to requests for any particular type of content. Those of skill in the art will recognize that a wide variety of content may by access through front-end server 210, including email messages, financial information, sports data, technical documents, databases, etc. Content, particularly content that is accessible over the World Wide Web and referred to as Web content, often includes markups to improve the content's display and/or scripts that may be executed. However, the present invention is not necessarily limited to any particular type of content.

Front-end server 210 may prevent insecure communications from entering or exiting private network 240 based on certain criteria. For example, front-end server 210 may prohibit any unencrypted HTTP requests from entering or exiting private network 240. Front-end server 210 may include encryption/decryption module 211 and HTTP router module 212.

Encryption/decryption module 211 decrypts messages received from a client, such as client 200, before forwarding them to a back-end server, such as back-end server 220c, and may encrypt messages received from a back-end server before forwarding them to a client. This may involve encryption or decryption operations to the content of an HTTP request, including requests that use SSL. Encryption and decryption may be used to map SSL connections to insecure connections or to map insecure connections to SSL connections.

Communication between the devices illustrated in FIG. 2 may take place using different protocols and may take place on different ports. For instance, one port may be configured for insecure connections using HTTP, while another may be configured for secure connections using HTTPS. For example, insecure HTTP communications conventionally occur over port 80 and secure HTTPS communications, ones that use SSL, occur over port 443. When information is received at one of these ports the front-end server processes the information consistent with the configuration of that port, insecure on port 80 and secure on port 443. While the present invention is discussed in the context of the exemplary configuration mentioned above, the invention is not limited to this configuration. The present invention may be practiced in any configuration where there is a client, a front-end server and one or more back-end servers, all of which may need to communicate over one or more networks using one or more protocols.

HTTP router module 212 tracks information about HTTP content that is received by front-end server 210. This tracking may include, which client requests were received over a particular connection and which client requests were sent to which back-end servers. If a request is received over an SSL connection, HTTP router module 212 adds a header to the request before it is forwarded to a back-end server. The included header notifies the back-end server that the original request was received over an SSL connection. Otherwise the back-end server would not know that the front-end server received the request over a secure SSL connection because the back-end server is aware only that it received the request from the front-end server on an unencrypted port (port 80 in this case).

In operation, client 200 generates HTTP request 250 and sends it to front-end server 210. The request, for example, may be for the email inbox associated with client 200. Email inboxes often show the sender, subject, and relevant dates for emails that have been received, including some type of indication whether or not a particular email has been read. However, the present invention is not necessarily limited to requests for an email inbox or any particular information being included within an email inbox. After generation, the request is sent to port 443 of front-end server 210 as SSL request 251. Encryption/decryption module 211 decrypts the request.

HTTP router module 212 includes information specifying the content that is available on the various back-end servers 220. The HTTP router module 212 determines that the request was an SSL request, adds a header to the request, and tracks that the request is sent to back-end server 220c. The header may comprise a "Via:" or "User-agent:" HTTP request header to indicate the request was received by front-end server 210 over an SSL connection and is being forwarded to back-end server 220c for processing. However, the present invention is not necessarily limited to the use of any particular header. Front-end server 210 then forwards the request and included header, as HTTP request 252, to port 80 of back-end server 220c. In one example, the header is "Front-End-HTTPS: on" and the header causes the back-end servers 220 to generate protocol specific resource identifiers in the requested content that are consistent with the connection between the client 200 and the front-end server 210.

The back-end server 220c processes the request and provides content that is compatible with a secure connection. For example, back-end server 220c may generate one or more protocol specific resource identifiers that are consistent with the SSL connection between client 200 and front-end server 210. For an HTTP version of the email inbox, this involves generating URLs that identify HTTPS as the protocol to be used in making requests for individual emails. Without the header that was included with the request, back-end server 220c would generate URLs that identify HTTP as the protocol to be used in making requests for individual emails because the request was received at port 80, the default HTTP port. If the appropriate protocol specific resource identifiers are not generated, then future client requests that originate from the protocol specific resource identifiers included in the returned content will fail. More specifically, the front-end server 210 may be configured to prohibit any unencrypted HTTP requests from entering or exiting the private network 240. The client 200 therefore communicates with the front-end server 210 using HTTPS, which sends client requests to port 443. If the URLs included in the content returned by the back-end servers 220 are HTTP URLs, then the client, upon selecting those URLs from the returned content, will attempt to use port 80 instead of port 443. A request to port 80 will fail because the front-end server will only accept secure requests to port 443. The present invention, by altering the URLs to conform with the protocol used between the client 200 and the front-end server 210, ensures that the client 200 makes requests using the appropriate protocol specific resource identifiers. Next, a response is sent back to the front end server 210, as HTTP response 253. Front-end server 210 receives the response and HTTP router module 212 determines that the response generated by back-end server 220c was the result of an SSL request from client 200. The response is encrypted by encryption/decryption module 211 and sent to client 200 as SSL response 254. The client receives SSL response 254 and views the requested data. If the client system selects one of the URLs, such as an individual email appearing in the inbox, client 200 generates an SSL request to front-end server 210 because the URL identifies HTTPS as the protocol to be used in making a request for the URL's content Front-end server 210 maps the SSL request to an HTTP request and directs the request to the appropriate back-end server. Most likely, the email contents will be stored at the same back-end server providing the inbox content, so the HTTP request will be forwarded to back-end server 220c. Back-end server 220c generates an HTTP version of the email content, but uses HTTPS as the protocol identifier for any URLs within the content, and sends the content to front-end server 210 as a response to the request for the email content that front-end server 210 made for client 200. Upon receiving the requested content, front-end server 210 performs the necessary processing for mapping the HTTP response to an SSL response. Front-end server 210 then sends the SSL response to client 200.

The operation of the components in FIG. 2 conserves the resources of the back-end server 220c and front-end server 210 because encryption and decryption may be performed only once at the front-end server 210. Furthermore, client 200 may request resources based on resource identifiers provided by a back-end servers 220, without regard to any differences in protocols for communicating between the client 200 and the front-end server 210 and protocols for communicating between the front-end server 210 and the back-end servers 220.

Figure 3A:
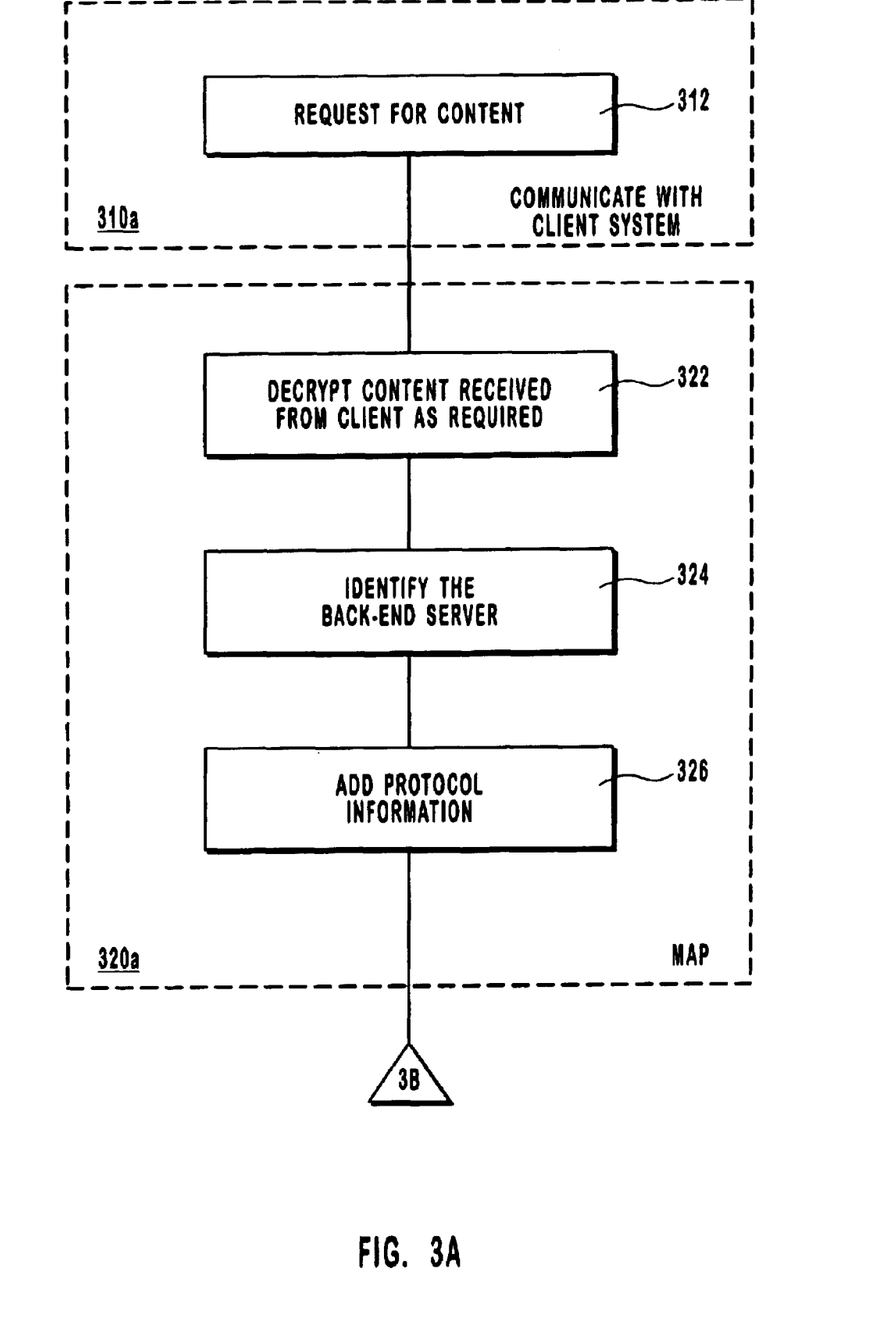
FIGS. 3A and 3B are a flow diagram illustrating a method for mapping connections and protocol specific resource identifiers.
Figure 3B:
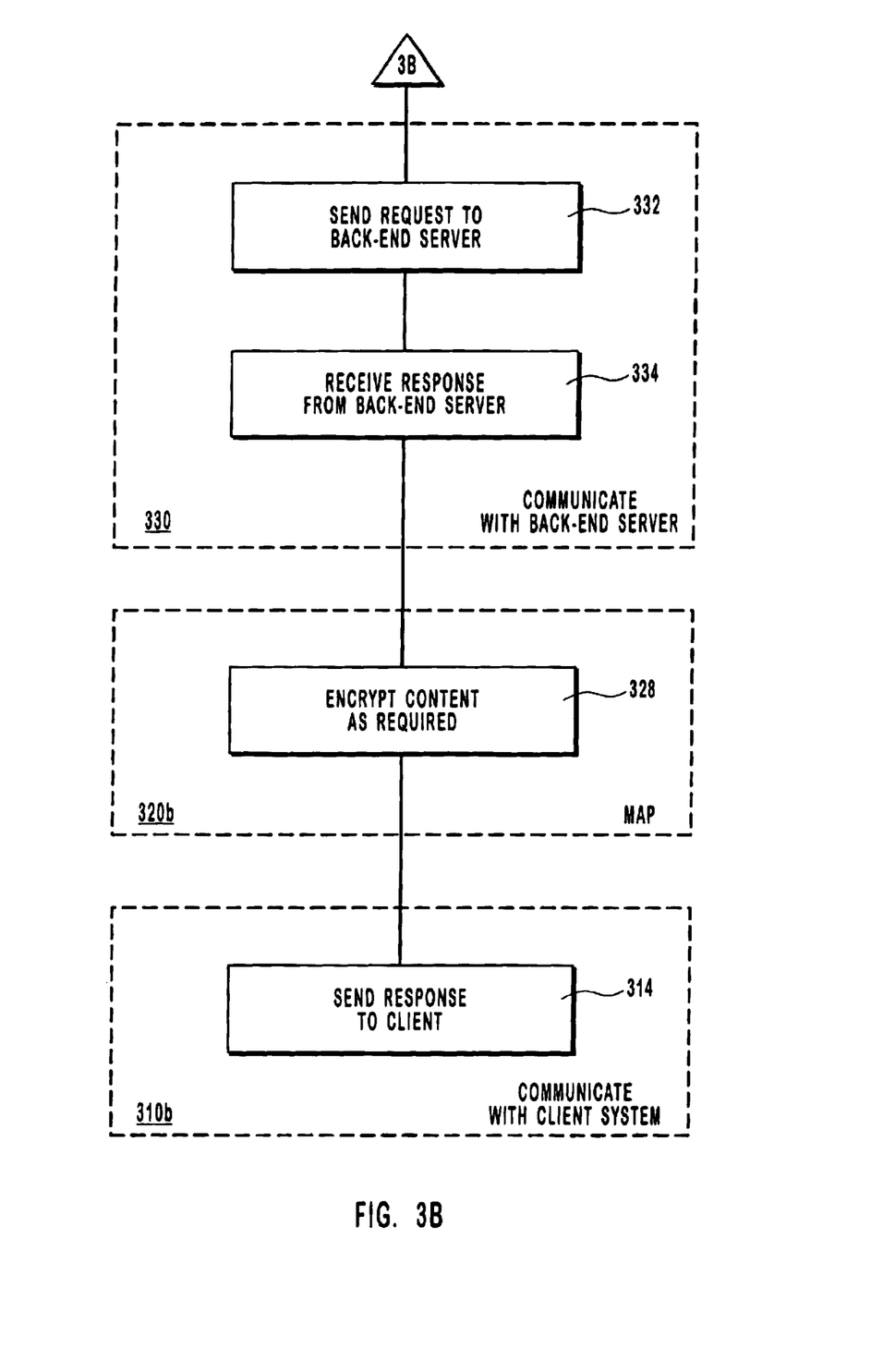

The operation of the components shown FIG. 2 will now be described with respect to FIGS. 3A and 3B, which are a flow diagram illustrating a method for mapping connections and protocol specific resource identifiers. A step for communicating (310a) with a client system includes the act of receiving a request (312) for content from the client system. A front-end server receives the request in accordance with the communication protocol used to exchange data between the client system and the front-end server. To insure privacy and data integrity, the communication protocol may comprise a secure protocol, such as SSL. However, a wide variety of secure protocols are known to those of skill in the art and the present invention is not necessarily limited to any particular protocol for communication between the front-end server and the client system. Other acts associated with the step for communicating (310a) will be described below, with regard to reference 310b.

A step for mapping (320a) communication between the client system and the front-end server, to communication between the front-end server and a back-end server, may include the act of decrypting (322) content received from the client if the communication between the client system and the front-end server is encrypted. For example, if the client is submitting a username and password with a request, the username and password may be encrypted. The details of what content is encrypted generally depends on the particular protocol used for secure communication. Therefore, both the act of decrypting (322) content and the act of encrypting content (328) should be interpreted to include all or any portion of the content, as may be appropriate for a particular protocol.

The step for mapping (320a) also may include an act of identifying (324) the back-end server where the requested content is available and an act of adding (326) protocol information to the request. The protocol information identifies the communication protocol between the front-end server and the client system. Although not shown, an act of tracking information associated with the client system's request for content may occur during the mapping step as well. This information may include, for example, an identifier for the connection between the client system and the front-end server and an identifier for the connection between the front-end server and the identified back-end server so that content received from the back-end server may be passed on to the client system using the appropriate connection. Other acts associated with the step for mapping (320a) will be described below, with regard to reference 320b.

A step for communicating (330) with the back-end server includes the acts of sending (322) the request to the back-end server and receiving (334) a response from the back-end server. Because the communication path between the front-end server and the back-end server may be isolated from external contact, and therefore protected from outside tampering, the protocol used for communication between the front-end server and the back-end server need not be a secure protocol. The present invention does not require the protocol used in communication between the front-end server and the client system to be the same as the protocol used in communication between the front-end server and the back-end server. Stated more generally, a communication protocol may be selected for one connection, without regard for the communication protocol selected for the other connection.

The content received from the back-end server may include one or more protocol specific resource identifiers. However, these protocol specific resource identifies are based on the protocol information, included with the request for content, that identify the protocol used for communicating between the front-end server and the client system. This allows the back-end server to account for protocol differences between how the front-end server communicates with the client system and how the front-end server communicates with the back-end server. For example, as described above, the front-end server may communicate with the client system using a secure communication protocol, such as SSL, and may communicate with the back-end server using an insecure protocol, such as HTTP. Uniform resource locators for HTTP begin with "http:" and uniform resource locators for HTTP implemented on top of SSL begin with "https:". If the back-end server generates resource identifiers based on HTTP, then the resource identifies in the content will not be valid at the client system because the client system communicates with the front-end server over a secure connection using SSL. In other words, the resource identifiers should indicate HTTPS as the protocol for requesting content associated with the resource identifiers. By identifying to the back-end server, the protocol used to communicate between the front-end server and the client system, the back-end server is able to generate resource identifiers that are appropriate for subsequent requests that may be made from the client system.

Returning now to the step for mapping (320a and 320b) and the step for communicating (310a and 310b), further acts that may be included within these steps will be described. The step for mapping (320b) includes an act of encrypting content if the protocol for communicating between the front-end server and the client system so requires, and an act of sending (314) the response to the client system may be part of the step for communicating (310b) with the client system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a system that includes a client system in communication with a server system having a front-end server and one or more back-end servers, wherein the client system requests content that is available on the one or more back-end servers through the front-end server, and wherein the content includes resource identifiers that are specific to a particular communication protocol, a method of mapping a connection between a client system and a front-end server to a connection between a front-end server and a back-end server, the method comprising the front-end server performing:

an act of receiving a request for content from the client system, the request being received in accordance with a first communication protocol, which is a secure protocol;

an act of identifying a particular back-end server where the content is available;

an act of adding protocol information to the request for content, the protocol information identifying the first communication protocol;

an act of sending the request for content to the particular back-end server, the request being sent in accordance with a second communication protocol; and an act of receiving a response from the particular back-end server in accordance with the second communication protocol, the response including the requested content and one or more resource identifiers that are specific to the first communication protocol, but wherein the back-end server would respond to the request from the front-end server with resource identifiers specific to the second communication protocol if the protocol information was not included in the request.

2. A method as recited in claim 1, further comprising the act of sending the response to the client system in accordance with the first communication protocol.

3. A method as recited in claim 2 wherein the first communication protocol comprises a secure communication protocol, the method further comprising the act of encrypting the content sent to the client system.

4. A method as recited in claim 1, wherein the one or more resource identifiers are uniform resource locators.

5. A method as recited in claim 1 wherein the first communication protocol comprises a secure communication protocol and the second communication protocol comprises an insecure communication protocol.

6. A method as recited in claim 5 further comprising the act of decrypting content received from the client system.

7. A method as recited in claim 5 wherein the first communication protocol comprises a secure sockets layer protocol.

8. A method as recited in claim 1 wherein the second communication protocol comprises the hypertext transfer protocol, and wherein the protocol information comprises a hypertext transfer protocol header.

9. A method as recited in claim 8 wherein the header is one of a "Via:" and a "User-agent:" header.

10. A method as recited in claim 8, the header comprises "Front-End-HTTPS: on".

11. A method as recited in claim 8 comprising a hypertext transfer protocol router at the front-end server performing an act of tracking information associated with the client system's request for content.

12. A method as recited in claim 1 wherein the request for content comprises a request for one of email content and Web content.

13. A method as recited in claim 1, wherein the second communication protocol comprises an insecure version of the first communication protocol.

14. A method as recited in claim 1, wherein the client system is configured to communicate with the front-end server in both the first and second communication protocols.

15. A method as recited in claim 1, wherein the one or more resource identifiers specific to the first and second communication protocols control the protocol that will be used by the client in making an additional request to the front-end server.

16. In a system that includes a client system in communication with a server system having a front-end server and one or more back-end servers, wherein the client system requests content that is available on the one or more back-end servers through the front-end server, and wherein the content may include resource identifiers that are specific to a particular communication protocol, a method of mapping a connection between a client system and a front-end server to a connection between the front-end server and a back-end server, the method comprising the front-end server performing:

a step for communicating with the client system using a first communication protocol, which is a secure protocol, the communicating including a request for content from the client system;

a step for communicating with a particular back-end server using a second communication protocol, the communicating including the request for content from the client system; and a step for mapping the communication with the client system using the first communication protocol to the communication with the particular back-end server using the second communication protocol, wherein the mapping includes:

an act of adding protocol information to the request for content that identifies the first communication protocol, and an act of receiving a response from the particular back-end server in accordance with the second communication protocol, the response including the requested content and one or more resource identifiers that are specific to the first communication protocol, but wherein the back-end server would respond to the request from the front-end server with resource identifiers specific to the second communication protocol if the protocol information was not included in the request.

17. A method as recited in claim 16, wherein the one or more resource identifiers are uniform resource locators.

18. A method as recited in claim 16, wherein the step for communicating with the client system using a first communication protocol comprises an act of sending the response to the client to the client system.

19. A method as recited in claim 18 wherein the first communication protocol comprises a secure communication protocol and the second communication protocol comprises an insecure communication protocol.

20. A method as recited in claim 19 wherein the step for mapping the communication with the client system using the first communication protocol to the communication with the particular back-end server using the second communication protocol comprises the acts of:
  decrypting content received form the client system;
  encrypting content sent to the client system; and
  tracking information associated with the client system's request for content.

21. A method as recited in claim 16 wherein the second communication protocol comprises the hypertext transfer protocol, and wherein the protocol information comprises a hypertext transfer protocol header.

22. A method as recited in claim 21 wherein the hypertext transfer protocol header comprises "Front-End-HTTPS: on".

23. In a system that includes a client system in communication with a server system, the server system including a front-end server and one or more back-end servers, wherein communication between the client system and the front-end server uses a first communication protocol and wherein communication between the front-end server and the one or more back-end servers uses a second communication protocol, a method of providing content through the front-end server to the client system such that the content complies with the first communication protocol, the method comprising one of the one or more back-end servers performing:
  an act of receiving a request for content from the front-end server, the request for content being received in accordance with the second communication protocol;
  an act of generating the requested content, wherein one or more resource identifiers included in the requested content are specific to the first communication protocol, which is a secure protocol; and
  an act of sending the requested content to the front-end server in accordance with the second communication protocol, the response including the requested content and one or more resource identifiers, wherein the resource identifiers are specific to the first communication protocol when the request for content includes protocol information identifying the first communication protocol, and wherein the resource identifiers are specific to the second communication protocol when the protocol information identifying the first communication protocol is not included in the request.

24. A method as recited in claim 23, wherein the first communication protocol is a secure communication protocol, and wherein the second communication protocol is an insecure version of the first communication protocol.

25. A method as recited in claim 23, further comprising the front-end server performing:
  an act of decrypting the request for content received from the client system; and
  an act of encrypting the requested content being sent to the client system.

26. A method as recited in claim 23, wherein the act of generating the requested content further comprises an act of changing the one or more resource identifiers included in the requested content to correspond with the first communication protocol.

27. A method as recited in claim 26, wherein the first communication protocol is HTTPS and the second communication protocol is HTTP, wherein the act of changing the one or more resource identifiers further comprises an act of changing an "HTTP" portion of a resource identifier to "HTTPS".

28. In a system that includes a client system in communication with a server system having a front-end server and one or more back-end servers, wherein the client system requests content that is available on the one or more bark-end servers through the front-end server, and wherein the content may include resource identifiers that are specific to a particular communication protocol, a computer program product for implementing a method of mapping a connection between a client system and a front-end server to a connection between the front-end server and a back-end server, comprising:
  a computer readable medium for carrying machine-executable instructions for implementing the method at a front-end server; and
  wherein said method is comprised of machine-executable instructions for performing the acts of:
    receiving a request for content from the client system, the request being received in accordance with a first communication protocol, which is a secure protocol;
    identifying a particular back-end server where the content is available;
    adding protocol information to the request for content, the protocol information identifying the first communication protocol;
    sending the request for content to the particular back-end server, the request being sent in accordance with a second communication protocol; and
    receiving a response from the particular back-end server in accordance with the second communication protocol, the response including the requested content and one or more resource identifiers that are specific to the first communication protocol, but wherein the back-end server would respond to the request from the front-end server with resource identifiers specific to the second communication protocol if the protocol information was not included in the request.

29. A computer program product as recited in claim 28, the method comprised further of machine-executable instructions for performing the act of sending the response to the client system in accordance with the first communication protocol.

30. A computer program product as recited in claim 29 wherein the first communication protocol comprises a secure communication protocol and the second communication protocol comprises and insecure communication protocol, the method being comprised further of machine-executable instructions for performing the acts of:
  decrypting content received from the client system; and
  encrypting the content sent to the client system.

31. A computer program product as recited in claim 28, wherein the one or more resource identifiers are uniform resource locators.

32. A computer program product as recited in claim 28 wherein the second communication protocol comprises the hypertext transfer protocol, and wherein the protocol information comprises a hypertext transfer protocol header.

33. A computer program product as recited in claim 28, the method comprised further of machine-executable instructions for performing the act of using a hypertext transfer protocol router at the front-end server to track information associated with the client system's request for content.

34. A computer program product as recited in claim 28 wherein the request for content comprises a request for one of email content and Web content.

* * * * *